United States Patent
Yang et al.

(10) Patent No.: US 12,308,968 B2
(45) Date of Patent: May 20, 2025

(54) CONTROL BLOCK BUNDLE FOR RETRANSMISSION

(71) Applicant: QUALCOMM Incorporated, San Diego, CA (US)

(72) Inventors: Wei Yang, San Diego, CA (US); Runxin Wang, San Diego, CA (US); Jing Jiang, San Diego, CA (US); Jay Kumar Sundararajan, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/650,560

(22) Filed: Feb. 10, 2022

(65) Prior Publication Data
US 2023/0254066 A1 Aug. 10, 2023

(51) Int. Cl.
*H04W 72/04* (2023.01)
*H04L 1/1607* (2023.01)
*H04L 1/1812* (2023.01)

(52) U.S. Cl.
CPC .......... *H04L 1/1812* (2013.01); *H04L 1/1671* (2013.01)

(58) Field of Classification Search
CPC ... H04L 1/1812; H04L 1/1671; H04L 1/1854; H04L 1/1864
See application file for complete search history.

(56) References Cited

U.S. PATENT DOCUMENTS

| | | | |
|---|---|---|---|
| 2009/0279460 A1* | 11/2009 | Sarkar | H04L 1/18 370/280 |
| 2013/0114474 A1* | 5/2013 | Fu | H04L 1/1635 370/280 |
| 2016/0233999 A1* | 8/2016 | Chendamarai Kannan | H04W 72/20 |
| 2016/0345326 A1* | 11/2016 | Yerramalli | H04L 1/1657 |
| 2017/0303284 A1* | 10/2017 | Xu | H04L 1/1607 |
| 2018/0083750 A1* | 3/2018 | Li | H04L 1/1819 |
| 2018/0375634 A1 | 12/2018 | Sun et al. | |
| 2019/0045489 A1* | 2/2019 | He | H04W 72/12 |
| 2019/0074952 A1 | 3/2019 | Bhattad et al. | |
| 2020/0220666 A1* | 7/2020 | Xue | H04L 1/0061 |
| 2021/0226737 A1* | 7/2021 | Huang | H04W 52/0229 |
| 2022/0061049 A1* | 2/2022 | Chen | H04W 72/0453 |

FOREIGN PATENT DOCUMENTS

| | | |
|---|---|---|
| WO | 2016126653 A1 | 8/2016 |
| WO | 2021147117 A1 | 7/2021 |

OTHER PUBLICATIONS

International Search Report and Written Opinion—PCT/US2023/060408—ISA/EPO—Apr. 28, 2023.

* cited by examiner

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a first device may receive, from a second device, multiple code blocks (CBs) of a transport block. The first device may identify a CB bundle of one or more contiguous CBs that include one or more CBs for which negative feedback is to be reported. The first device may transmit, to the second device, an indication of the CB bundle. Numerous other aspects are described.

30 Claims, 10 Drawing Sheets

CONTROL BLOCK BUNDLE FOR RETRANSMISSION

FIELD OF THE DISCLOSURE

Aspects of the present disclosure generally relate to wireless communication and to techniques and apparatuses for using control block bundles for retransmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first device. The method may include receiving, from a second device, multiple code blocks (CBs) of a transport block (TB). The method may include identifying a CB bundle of one or more contiguous CBs that include one or more CBs for which negative feedback is to be reported. The method may include transmitting, to the second device, an indication of the CB bundle.

Some aspects described herein relate to a method of wireless communication performed by a second device. The method may include transmitting, to a first device, multiple CBs of a TB. The method may include receiving an indication of a CB bundle of one or more contiguous CBs that include one or more CBs with negative feedback. The method may include transmitting, to the first device, an indication of retransmitted CBs for the CB bundle. The method may include transmitting, to the first device, the retransmitted CBs.

Some aspects described herein relate to a first device for wireless communication. The first device may include a memory and one or more processors coupled to the memory. The one or more processors may be configured to receive, from a second device, multiple CBs of a TB. The one or more processors may be configured to identify a CB bundle of one or more contiguous CBs that include one or more CBs for which negative feedback is to be reported. The one or more processors may be configured to transmit, to the second device, an indication of the CB bundle.

Some aspects described herein relate to a second device for wireless communication. The second device may include a memory and one or more processors coupled to the memory. The one or more processors may be configured to transmit, to a first device, multiple CBs of a TB. The one or more processors may be configured to receive an indication of a CB bundle of one or more contiguous CBs that include one or more CBs with negative feedback. The one or more processors may be configured to transmit, to the first device, an indication of retransmitted CBs for the CB bundle. The one or more processors may be configured to transmit, to the first device, the retransmitted CBs.

Some aspects described herein relate to a non-transitory computer-readable medium that stores a set of instructions for wireless communication by a first device. The set of instructions, when executed by one or more processors of the first device, may cause the first device to receive, from a second device, multiple CBs of a TB. The set of instructions, when executed by one or more processors of the first device, may cause the first device to identify a CB bundle of one or more contiguous CBs that include one or more CBs for which negative feedback is to be reported. The set of instructions, when executed by one or more processors of the first device, may cause the first device to transmit, to the second device, an indication of the CB bundle.

Some aspects described herein relate to a non-transitory computer-readable medium that stores a set of instructions for wireless communication by a second device. The set of instructions, when executed by one or more processors of the second device, may cause the second device to transmit, to a first device, multiple CBs of a TB. The set of instructions, when executed by one or more processors of the second device, may cause the second device to receive an indication of a CB bundle of one or more contiguous CBs that include one or more CBs with negative feedback. The set of instructions, when executed by one or more processors of the second device, may cause the second device to transmit, to the first device, an indication of retransmitted CBs for the CB bundle. The set of instructions, when executed by one or more processors of the second device, may cause the second device to transmit, to the first device, the retransmitted CBs.

Some aspects described herein relate to an apparatus for wireless communication. The apparatus may include means for receiving, from another apparatus, multiple CBs of a TB. The apparatus may include means for identifying a CB bundle of one or more contiguous CBs that include one or more CBs for which negative feedback is to be reported. The apparatus may include means for transmitting, to the other apparatus, an indication of the CB bundle.

Some aspects described herein relate to an apparatus for wireless communication. The apparatus may include means for transmitting, to another apparatus, multiple CBs of a TB. The apparatus may include means for receiving an indication of a CB bundle of one or more contiguous CBs that include one or more CBs with negative feedback. The apparatus may include means for transmitting, to the other apparatus, an indication of retransmitted CBs for the CB bundle. The apparatus may include means for transmitting, to the other apparatus, the retransmitted CBs.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
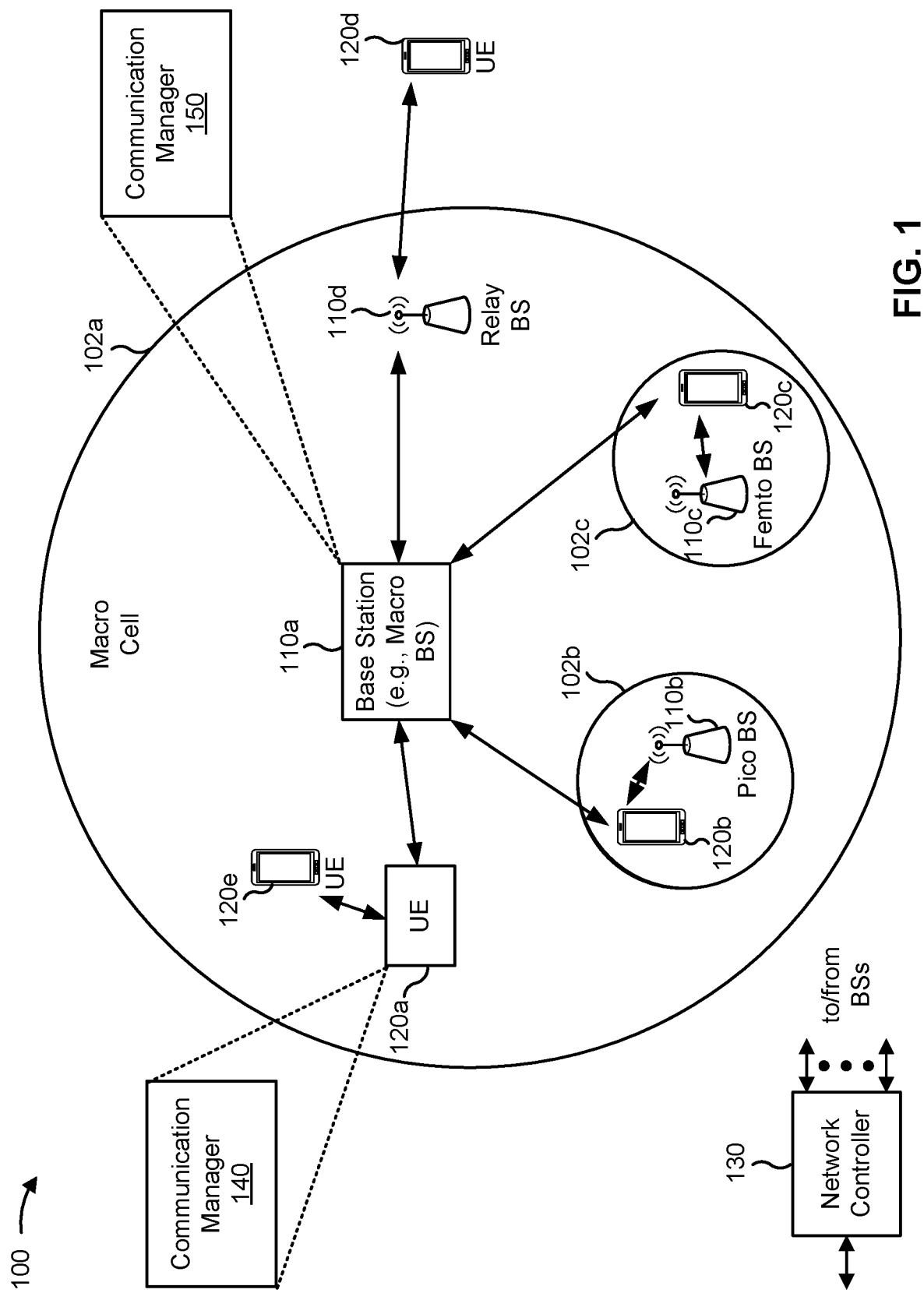
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) may refer to an aggregated base station, a disaggregated base station, and/or one or more components of a disaggregated base station. For example, in some aspects, "base station" may refer to a central unit (CU), distributed units (DUs), and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., a UE 120, a network entity) may include a communication manager 140 or 150. As described in more detail elsewhere herein, the communication manager 140 or 150 may receive, from a second device, multiple code blocks (CBs) of a transport block (TB). The communication manager 140 or 150 identify a CB bundle of one or more contiguous CBs that include one or more CBs for which negative feedback is to be reported. The communication manager 140 or 150 may transmit, to the second device, an indication of the CB bundle. Additionally, or alternatively, the communication manager 140 or 150 may perform one or more other operations described herein.

In some aspects, a second device (e.g., a UE 120, a network entity) may include a communication manager 140 or 150. As described in more detail elsewhere herein, the communication manager 140 or 150 may transmit, to a first device, multiple CBs of a TB; receive an indication of a CB bundle of one or more contiguous CBs that include one or more CBs with negative feedback; transmit, to the first device, an indication of retransmitted CBs for the CB bundle; and transmit, to the first device, the retransmitted CBs. Additionally, or alternatively, the communication manager 140 or 150 may perform one or more other operations described herein.

As indicated above, FIG. 1 is provided as an example. Other examples may differ from what is described with regard to FIG. 1.

Figure 2:
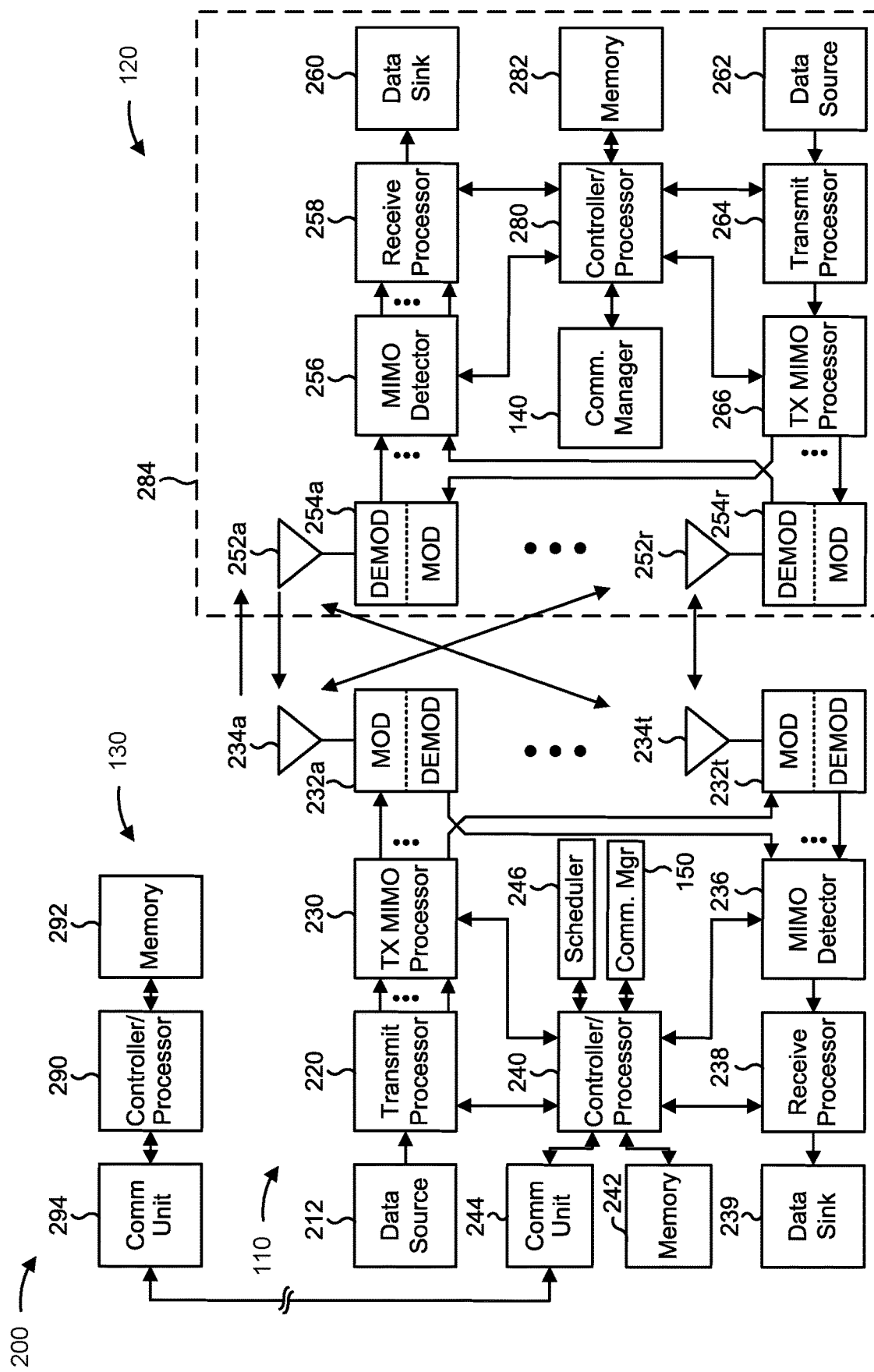
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

A controller/processor of a network entity, (e.g., the controller/processor 240 of the base station 110), the controller/processor 280 of the UE 120, and/or any other component(s) of FIG. 2 may perform one or more techniques associated with using CB bundles for retransmission, as described in more detail elsewhere herein. In some aspects, the first device and/or the second device described herein is the UE 120, is included in the UE 120, or includes one or more components of the UE 120 shown in FIG. 2. In some aspects, the first device and/or the second device described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first device (e.g., a UE 120, a network entity) includes means for receiving, from a second device, multiple CBs of a TB; means for identifying a CB bundle of one or more contiguous CBs that include one or more CBs for which negative feedback is to be reported; and/or means for transmitting, to the second device, an indication of the CB bundle. In some aspects, the means for the first device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second device (e.g., a UE 120, a network entity) includes means for transmitting, to a first device, multiple CBs of a TB; means for receiving an indication of a CB bundle of one or more contiguous CBs that include one or more CBs with negative feedback; means for transmitting, to the first device, an indication of retransmitted CBs for the CB bundle; and/or means for transmitting, to the first device, the retransmitted CBs. In some aspects, the means for the second device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
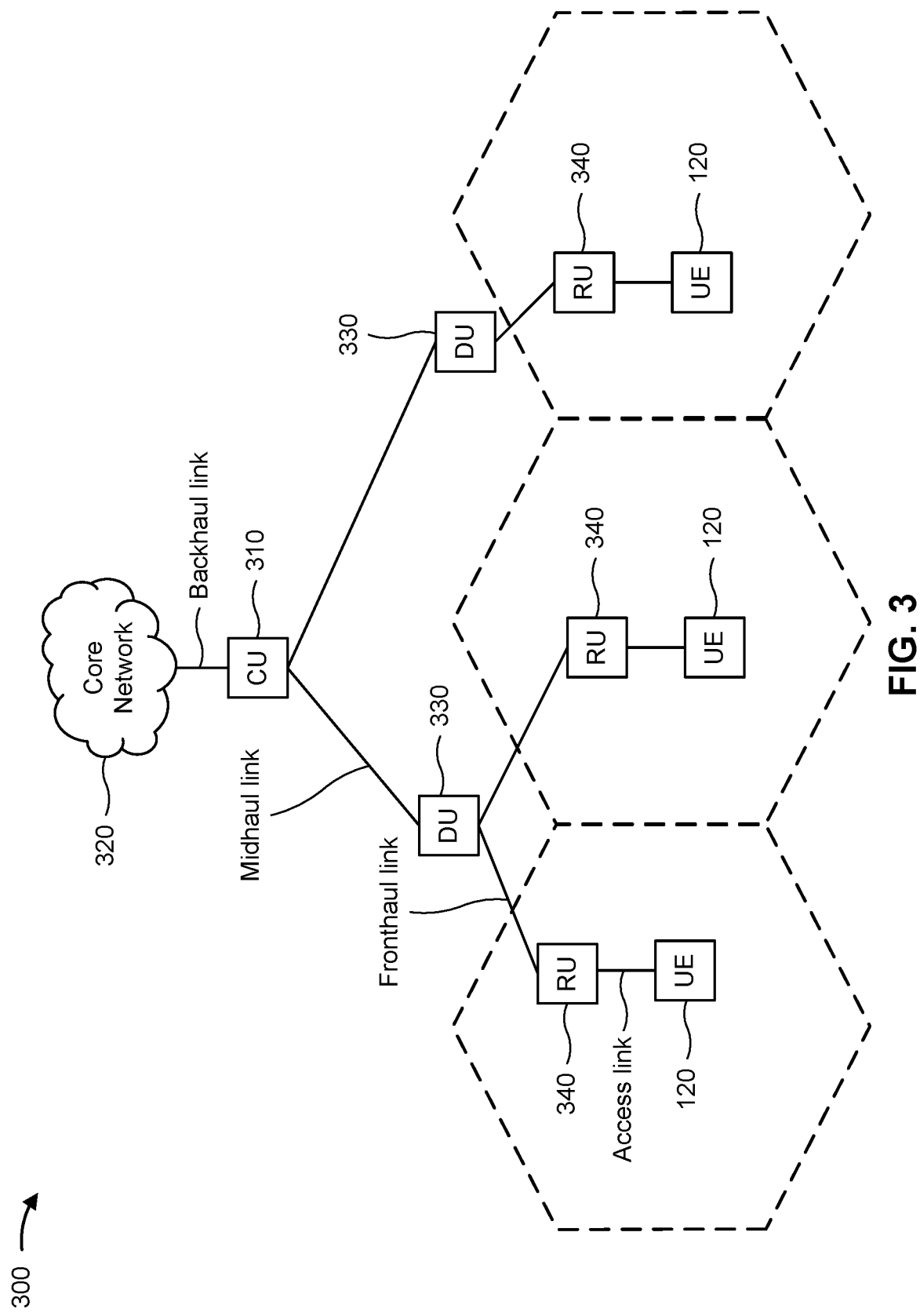
FIG. 3 is a diagram illustrating an example of an open radio access network architecture, in accordance with the present disclosure.

FIG. 3 is a diagram illustrating an example 300 of an open radio access network (O-RAN) architecture, in accordance with the present disclosure. As shown in FIG. 3, the O-RAN architecture may include components of a network entity, such as a disaggregated base station (e.g., base station 110). The components may include a CU 310 that communicates with a core network 320 via a backhaul link. Furthermore, the CU 310 may communicate with one or more DUs 330 via respective midhaul links.

The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as "O-RAN DUs (O-DUs)" 330 and "O-RAN RUs (O-RUs)" 340, respectively. A network entity may include a CU, a DU, an RU, or any combination of CUs, DUs, and RUs. The fronthaul link, the midhaul link, and the backhaul link may be generally referred to as "communication links." A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

In some aspects, the DUs 330 and the RUs 340 may be implemented according to a functional split architecture in which functionality of a network entity (e.g., an eNB or a gNB) is provided by a DU 330 and one or more RUs 340 that communicate over a fronthaul link. Accordingly, as described herein, a network entity may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
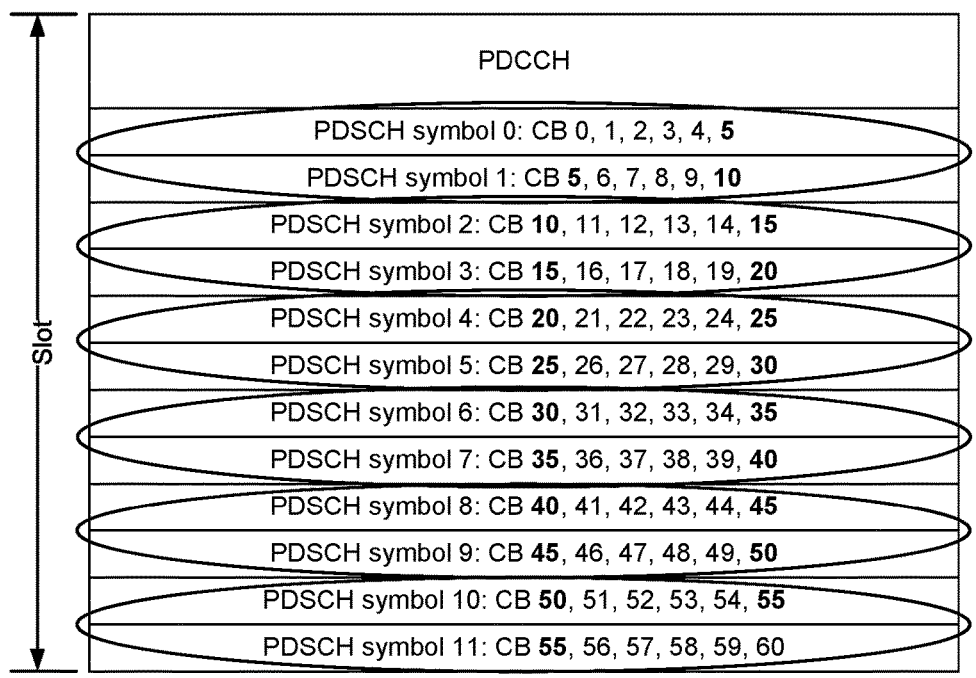
FIG. 4 is a diagram illustrating an example of transmitting a transport block using code blocks (CBs), in accordance with the present disclosure.

FIG. 4 is a diagram illustrating an example 400 of transmitting a TB using CBs, in accordance with the present disclosure.

When transmitting TBs of larger sizes, NR may reuse the same TB to CB segmentation approach. A TB may be segmented into multiple CBs with a maximum CB size of 8448 bits. The TB may contain 150 CBs for a 100 MHz bandwidth, 4 layers, and 256 quadrature amplitude modulation (QAM) in sub-6 GHz frequencies. Example 400 shows symbols that carry CBs. CBs may be separately encoded with a separate CB cyclic redundancy checks (CRC) and a TB CRC. Both LTE and NR use the TB to CB segmentation method to serve large TB sizes. However, because the throughput for NR is much higher than LTE, the number of CBs contained in a TB for NR can be much greater than the number of CBs contained in a TB for LTE.

To increase retransmission efficiency, code block group (CBG)-based hybrid automatic repeat request (HARQ)-acknowledgement (ACK) feedback was introduced in NR. A CBG is a group of CBs. Compared to TB-based HARQ-ACK feedback (feedback for whole TB) and retransmission, CBG-based feedback allows a UE to provide more granular feedback to the network entity (e.g., gNB). The network entity may then retransmit the unsuccessful CBs with a per-CBG granularity. In NR, a maximum of 8 CBGs per TB can be configured in a single-TB case, and a maximum of 4 CBGs per TB can be configured in a multi-TB case (e.g., when the number of spatial layers are larger than 4). In addition, a CBG flushing indicator was introduced to indicate whether a previous CBG needs to be flushed by a receiver (e.g., previous transmission is invalid and cannot be combined with the retransmissions).

When CBG-based feedback is configured, the UE may feedback a 1 bit HARQ-ACK per CBG (ACK if all CBs in the CBG are correctly decoded, and negative acknowledgment (NACK) otherwise). The network entity may only retransmit the CBGs that are in error from the previous transmission. The number of HARQ-ACK bits that the UE reports per TB may be equal to the number of CBGs in the TB. The downlink control information (DCI) containing the initial and retransmitted downlink grants may all contain a CBG field that is equal in size to the maximum number of CBGs per TB, to indicate which CBGs are retransmitted by the network entity.

In future releases of NR and in 6G, the supported throughput will be much higher than the throughput supported by current NR networks. As a consequence, the number of CBs contained in a TB could be much higher (e.g., 10-100 times higher). Therefore, when the number of CBs in a TB becomes large, it may be beneficial to increase the granularity of the feedback (e.g., increase beyond 8 CBGs). However, using CBG-based feedback with large TBs will significantly increase signaling resources (e.g., DCI) that are used for HARQ-ACK feedback and increase signaling resources that are used to retransmit CBs.

As indicated above, FIG. 4 is provided as an example. Other examples may differ from what is described with regard to FIG. 4.

Figure 5:
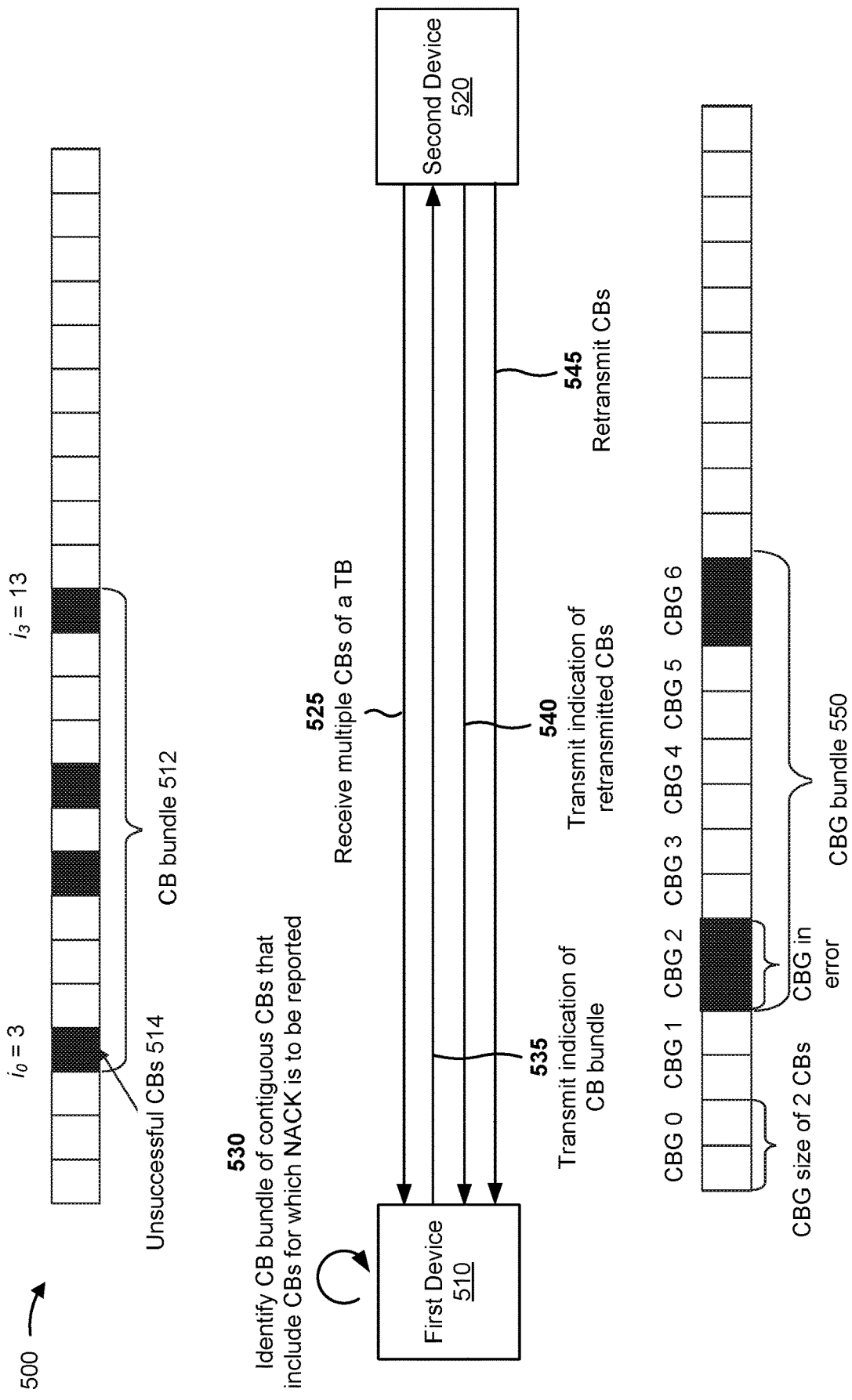
FIG. 5 is a diagram illustrating an example of using a CB bundle to indicate feedback, in accordance with the present disclosure.

FIG. 5 is a diagram illustrating an example 500 of using a CB bundle to indicate HARQ feedback, in accordance with the present disclosure. As shown in FIG. 5, a first device 510 (e.g., a UE 120, a network entity, component of a network entity) and a second device 520 (e.g., a UE 120, a network entity, a component of a network entity) may communicate with one another.

According to various aspects described herein, the first device 510 may use an adjustable CB bundle of contiguous CBs to indicate unsuccessful CBs for which negative feedback is to be reported. CBs for which negative feedback is to be reported may include CBs that are not correctly decoded by the first device 510 and/or CBs that are indicated as NACK by the first device 510. The CBs that are indicated as a NACK may include some CBs that are correctly decoded by the first device 510. The one or more contiguous CBs in the CB bundle may include the one or more unsuccessful CBs. All or some of the contiguous CBs may be unsuccessful CBs. A CB bundle may span across a boundary between two CBGs and/or include a portion of a CBG. A CB bundle may span multiple CBGs or less than a CBG.

Example 500 shows the use of a CB bundle for retransmitting CBs. As shown by reference number 525, the first device 510 may receive multiple CBs of a TB from second device 520. Some CBs may be unsuccessful. As shown by reference number 530, the first device 510 may identify a CB bundle (e.g., CB bundle 512) of one or more contiguous CBs that include one or more unsuccessful CBs 514 for which negative feedback is to be reported. The CB bundle 512 in example 500 shows 11 contiguous CBs with 4 unsuccessful CBs 514. The CBs in the TB may be indexed from 0 to $N_{max}-1$, where $N_{max}$ is the maximum quantity of CBs per TB in the cell or component carrier. The unsuccessful CBs 514 may be denoted by $\{i_0, i_1, \ldots, i_{N_{NACK}-1}\}$, where i increases in ascending order. The first unsuccessful CB ($i_0$) in the CB bundle 512 has an index of 3 and the last unsuccessful CB ($i_s$) in the CB bundle 512 has an index of 13. The first unsuccessful CB may be the starting CB index in an indication of the CB bundle 512, and the last unsuccessful CB may be the ending CB index in the indication. As shown by reference number 535, the first device 510 may transmit the indication of the CB bundle 512 to the second device 520. Alternatively, in some aspects, the first device 510 may include the starting CB and a length of the CB bundle 512 (e.g., 11 CBs for CB bundle 512) in the indication.

By indicating a CB bundle that can adjust to the size and distribution of the unsuccessful CBs, the first device 510 may use fewer bits to indicate unsuccessful CBs in much larger TBs. The feedback overhead may be $\log_2 \lceil N_{max}(N_{max}+1)/2 \rceil$, because there are $\binom{N_{max}}{2}+N_{max}=N_{max}(N_{max}+1)/2$ possible combinations of smallest and largest indices (note that the smallest index could be equal to largest index, in case only 1 CB is in error). Additionally, or alternatively, the feedback overhead may be $\log_2$ $$\left\lceil \frac{N_{max}(N_{max}+1)}{2} + 1 \right\rceil,$$

where 1 additional codepoint is added to indicate that all CBs are correctly decoded by the receiver (i.e., no CBs are in error). For example, if there is a maximum of 1000 CBs per TB, the quantity of HARQ-ACK bits may 19 bits. Furthermore, because the granularity of a CB bundle is adjustable, the second device 520 may retransmit fewer CBs. By comparison, for CBG-based feedback, the second device 520 may retransmit 50-100 CBs for each CBG. A CB bundle may not be restricted to alignment with symbol boundaries like a CBG.

In some aspects, there may be only one CB that is in error. By using a CB bundle, the second device 520 may retransmit only one CB. By contrast, with existing CBG-based feedback, the second device 520 may retransmit 50-110 CBs. If there is only one CB that is unsuccessful, the starting CB and the ending CB in the indication may be the same, and the length may be 1.

In some aspects, no CBs may be in error, and an indication of a CB bundle may be for an empty CB bundle or otherwise indicate that there are no CBs that are in error. One codepoint in the CBG-bundle feedback indication (from receiver to transmitter) may be used to indicate that all CBs in the TB are correctly decoded by the first device 510. This codepoint could either be an all zeros codepoint (i.e., 0000), or an all ones codepoint (i.e., 1111), or via some other method. For example, if a staring CB and length-based indication is used, then a length=0 may indicate that all CBs are correctly decoded by the first device 510. If a starting CB index-based method is used, then a starting CB index may equal the maximum quantity of CBs per TB (i.e., N_max)+1 bit to indicate that all CBs are correctly decoded by the first device 510 (e.g., the first erroneous CB index is greater than the maximum quantity of CBs in a TB). Alternatively, in some aspects, the first device 510 may skip the HARQ-ACK feedback when all CBs are correctly decoded. That is, no feedback from the first device 510 may mean that all CBs are correctly decoded.

In some aspects, the first device 510 may indicate the starting CB, and the CB bundle 512 may include the remaining CBs of the TB, up until the last CB of the TB. The starting CB may be the smallest index, and the feedback overhead may be $\log_2[N_{max}]$, or $\log_2 [N_{max}+1]$ where 1 additional codepoint is added to indicate that all CBs are correctly decoded by the receiver (i.e., no CBs are in error). CBs with larger indices than the smallest reported index may be retransmitted. In this case, the overhead may be 10 bits when the maximum quantity of CBs per TB is 1000.

The second device 520 may interpret CBs in the CB bundle 512 as being associated with a NACK, and CBs outside the CB bundle 512 as being associated with an ACK. The second device 520 may prepare to retransmit the CBs (or selected CBs) of the CB bundle 512. In some aspects, as shown by reference number 540, the second device 520 may indicate the CBs to be retransmitted by indicating a (retransmit) CB bundle or otherwise using the same format that the first device 510 used to indicate the CB bundle 512. The second device 520 may indicate the CBs to be retransmitted in a downlink grant. As shown by reference number 545, the second device 520 may retransmit the CBs that were indicated.

In some scenarios, a distribution of the CB in error may be highly localized and thus most of the CBs in the CB bundle 512 may be in error. Consequently, an adjustable CB bundle may be an efficient use of signaling resources because most or all of the contiguous CBs in the CB bundle will need to be retransmitted. Note that if some OFDM symbols are corrupted by strong interference, then all the CBs in these OFDM symbols may be in error.

In some scenarios, the error event may be due to the first device 510 having no time to decode the remaining CBs in the TB before the feedback is to be transmitted. In this scenario, it is likely that all CBs that were decoded by the first device 510 are correct and only the remaining undecoded CBs are to be retransmitted. Accordingly, the first device 510 may indicate only the index of the first CB that is in error (first CB not decoded). The CB bundle may include all remaining CBs that will be in error and that will be retransmitted.

In some aspects, instead of using a CB bundle for feedback and retransmission, a coarser granularity may involve a bundle of CBGs. For example, the first device 510 may partition the unsuccessful CBs into one or more CBGs (e.g., CBG 2 and CBG 6 in example 500). Each CBG may have multiple CBs. The first device 510 may determine a CBG bundle 550 of contiguous CBGs that includes CBG 2 and CBG 6, which are in error, and intervening CBGs CBG 3, CBG 4, and CBG 5. The first device 510 may transmit an indication of the CBG bundle 550, and the second device 520 may retransmit CBs of the CBG bundle 550. The first device 510 may indicate a starting CBG and an ending CBG of the CBG bundle 550, a starting CBG and a length of the CBG bundle 550, or just the starting CBG of the CBG bundle 550. The second device 520 may indicate CB retransmissions similarly. By using a CBG bundle, the coarser granularity of the CBG bundle may help the first device 510 and the second device 520 to conserve overhead (signaling resources) with larger TBs.

As indicated above, FIG. 5 is provided as an example. Other examples may differ from what is described with respect to FIG. 5.

Figure 6:
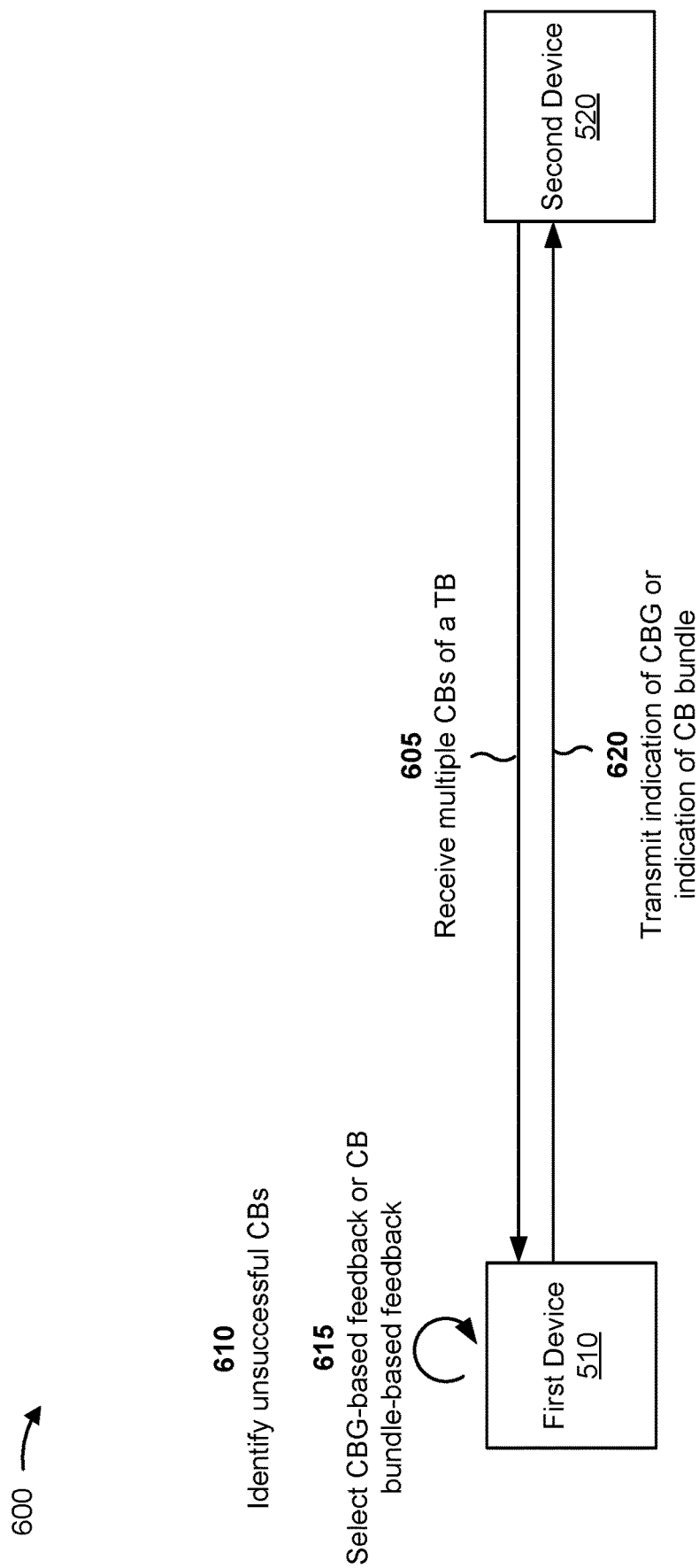
FIG. 6 is a diagram illustrating an example of switching between CB group-based feedback and CB bundle-based feedback, in accordance with the present disclosure.

FIG. 6 is a diagram illustrating an example 600 of switching between CBG-based feedback and CB bundle-based feedback, in accordance with the present disclosure.

In some aspects, the first device 510 may be configured to use TB-based feedback, CBG-based feedback, and/or CB bundle-based feedback. The first device 510 may be semi-statically configured (via RRC messages) to use a particular feedback mode.

Alternatively, in some aspects, the first device 510 may be configured to dynamically switch between CBG-based feedback and CB bundle-based feedback. The first device 510 may select CBG-based feedback or CB bundle-based feedback based at least in part on a distribution pattern of the unsuccessful CBs (e.g., CBs in error are close together or spread out) and/or a quantity of the unsuccessful CBs. The first device 510 may select CBG-based feedback or CB bundle-based feedback based at least in part on which mode yields a smaller quantity of CBs to be retransmitted or would use a smaller quantity of bits for the feedback. Note that while 1 bit may be used for TB-based feedback, the quantity of bits for CBG-based feedback may be up to the maximum quantity of CBGs, and the quantity of bits for CB bundle-based feedback may correspond to the maximum quantity of CBs.

If the first device 510 is in one feedback mode and another feedback mode is selected, the first device 510 may switch to the other feedback mode. Example 600 shows that the first device 510 may switch between feedback modes. As shown by reference number 605, the first device 510 may receive multiple CBs of a TB. Some CBs may be unsuccessful. As shown by reference number 610, the first device 510 may identify unsuccessful CBs for which negative feedback is to be reported. The first device 510 may also identify a distribution and/or quantity of the unsuccessful CBs, which may help determine how many bits are to be used for feedback and/or how many CBs will be transmitted. As shown by reference number 615, the first device 510 may select CBG-based feedback or for the CB bundle-based feedback. This selection may be based at least in part on how many bits may be used for feedback and/or how many CBs will be transmitted for CBG-based feedback and how many bits may be used for feedback and/or how many CBs will be transmitted for CB bundle-based feedback. In some aspects, the first device 510 may select a mode that yields smaller feedback or fewer CBs to be retransmitted (which may include all the CBs that are not correctly decoded by the first device 510). In some aspects, the first device 510 may select a mode based on the distribution. For example, if the unsuccessful CBs are highly localized, then the first device 510 may select CB bundle-based feedback. If the unsuccessful CB are independent or more spread out, the first device 510 may select CBG-based feedback.

As shown by reference number 620, the first device 510 may transmit an indication of a CBG or an indication of a CB bundle, based on which feedback mode is selected. The first device 510 may include, in or with the indication, a bit that indicates whether the feedback mode is CBG-based or CB bundle-based. This may be used for the second device 520 to understand how to interpret the feedback from the first device 510. This bit (of feedback mode) may be the first bit (or the last bit) of the set of bits transmitted by the first device 510. In some aspects, the second device 520 may also indicate (e.g., with a bit) whether the second device 520 is using CBG-based retransmission or CB bundle-based retransmission. This may be applicable because the second device 520 may retransmit CBs in different groupings or patterns than indicated by the first device 510. For example, if the first device 510 indicates a CB bundle with CB indices {3, 4, . . . , 10}, then the second device 520 may retransmit CBs {3, 4, 5, 6} and then retransmit CBs {7, 8, 9, 10}. The indications may provide more flexibility with feedback and CB retransmissions.

As indicated above, FIG. 6 is provided as an example. Other examples may differ from what is described with regard to FIG. 6.

Figure 7:
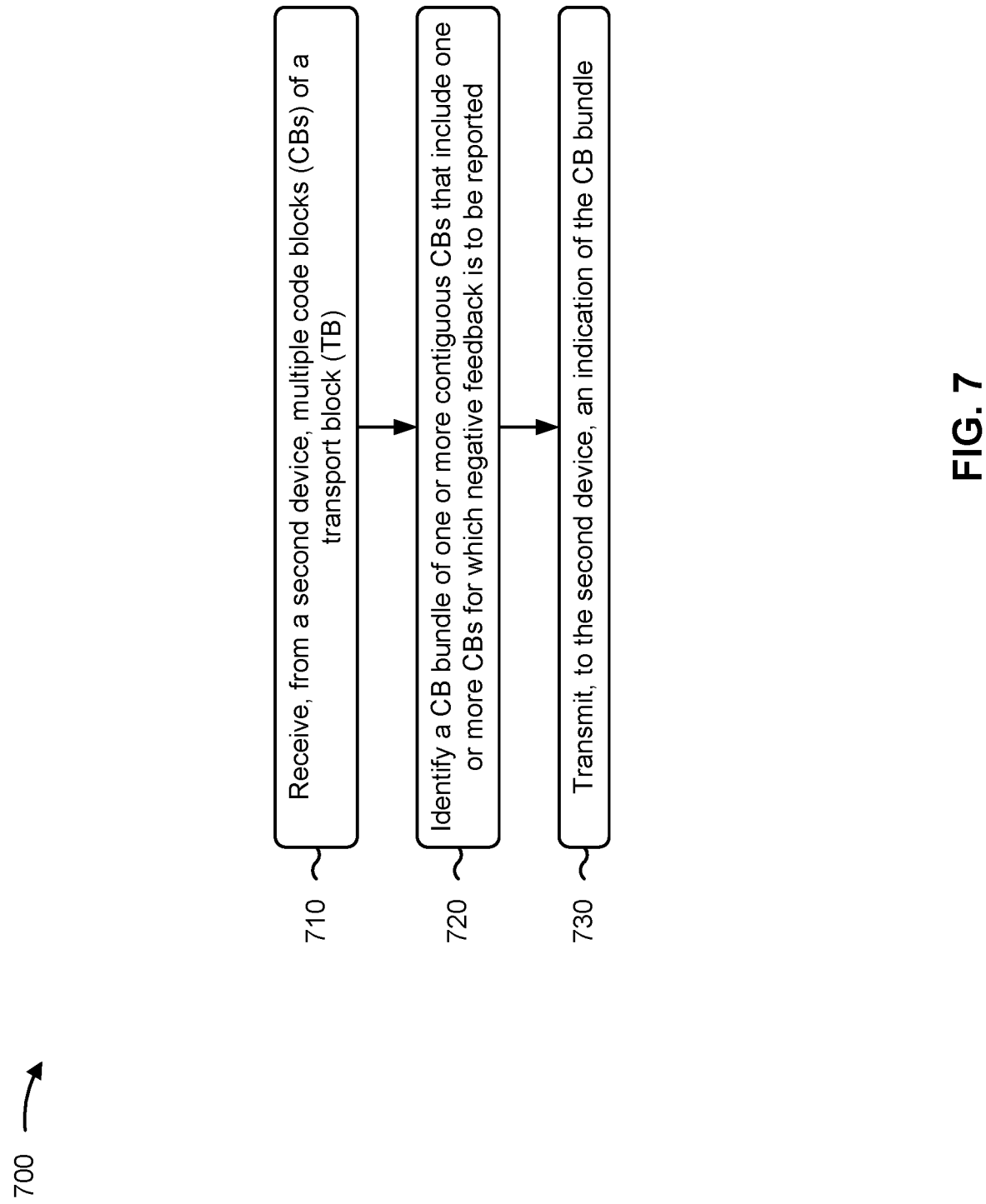
FIG. 7 is a diagram illustrating an example process performed, for example, by a first device, in accordance with the present disclosure.

FIG. 7 is a diagram illustrating an example process 700 performed, for example, by a first device, in accordance with the present disclosure. Example process 700 is an example where the first device (e.g., first device 510) performs operations associated with using CB bundles for feedback and retransmission.

As shown in FIG. 7, in some aspects, process 700 may include receiving, from a second device, multiple CBs of a TB (block 710). For example, the first device (e.g., using communication manager 908 and/or reception component 902 depicted in FIG. 9) may receive, from a second device, multiple CBs of a TB, as described above.

As further shown in FIG. 7, in some aspects, process 700 may include identifying a CB bundle of one or more contiguous CBs that include one or more CBs for which negative feedback is to be reported (block 720). For example, the first device (e.g., using communication manager 908 and/or bundling component 910 depicted in FIG. 9) may identify a CB bundle of one or more contiguous CBs that include one or more CBs for which negative feedback is to be reported, as described above.

As further shown in FIG. 7, in some aspects, process 700 may include transmitting, to the second device, an indication of the CB bundle (block 730). For example, the first device (e.g., using communication manager 908 and/or transmission component 904 depicted in FIG. 9) may transmit, to the second device, an indication of the CB bundle, as described above.

Process 700 may include additional aspects, such as any single aspect or any combination of aspects described below and/or in connection with one or more other processes described elsewhere herein.

In a first aspect, the indication of the CB bundle corresponds to a HARQ feedback (e.g., HARQ-ACK feedback of NACK) for the TB.

In a second aspect, alone or in combination with the first aspect, identifying the CB bundle includes selecting an adjustable length of the CB bundle based at least in part on a quantity and distribution of the one or more CBs for which negative feedback is to be reported.

In a third aspect, alone or in combination with one or more of the first and second aspects, the indication of the CB bundle indicates a starting CB and an ending CB for the CB bundle.

In a fourth aspect, alone or in combination with one or more of the first through third aspects, the starting CB is the same as the ending CB, and the CB bundle is one CB.

In a fifth aspect, alone or in combination with one or more of the first through fourth aspects, the indication of the CB bundle indicates a starting CB and a length of the CB bundle.

In a sixth aspect, alone or in combination with one or more of the first through fifth aspects, the CB bundle is one CB.

In a seventh aspect, alone or in combination with one or more of the first through sixth aspects, the indication of the CB bundle indicates a starting CB, and the CB bundle includes CBs of the TB from the starting CB until a last CB of the TB.

In an eighth aspect, alone or in combination with one or more of the first through seventh aspects, the CB bundle spans across a boundary between two CBGs.

In a ninth aspect, alone or in combination with one or more of the first through eighth aspects, the CB bundle includes one or more CBGs.

In a tenth aspect, alone or in combination with one or more of the first through ninth aspects, the indication of the CB bundle includes one bit or a quantity of bits that corresponds to a maximum quantity of CB groups that include the one or more CBs for which negative feedback is to be reported.

In an eleventh aspect, alone or in combination with one or more of the first through tenth aspects, process 700 includes determining a quantity of bits for the indication of the CB bundle in downlink control information based at least in part on a maximum quantity of CBs in the TB.

In a twelfth aspect, alone or in combination with one or more of the first through eleventh aspects, process 700 includes dynamically switching to a CB bundle-based feedback mode that uses a CB bundle to indicate negative feedback or to a CBG-based feedback mode that uses CBGs to indicate negative feedback.

In a thirteenth aspect, alone or in combination with one or more of the first through twelfth aspects, the indication of the CB bundle indicates that the indication includes CB bundle-based feedback.

In a fourteenth aspect, alone or in combination with one or more of the first through thirteenth aspects, the dynamically switching includes dynamically switching to the CB bundle-based feedback mode or to the CBG-based feedback mode based at least in part on a distribution pattern of the one or more CBs for which negative feedback is to be reported.

In a fifteenth aspect, alone or in combination with one or more of the first through fourteenth aspects, the dynamically switching includes dynamically switching to the CB bundle-based feedback mode or to the CBG-based feedback mode based at least in part on which mode yields a smaller quantity of the one or more CBs that are to be retransmitted.

In a sixteenth aspect, alone or in combination with one or more of the first through fifteenth aspects, process 700 includes receiving an indication of retransmitted CBs for the CB bundle and receiving the retransmitted CBs.

In a seventeenth aspect, alone or in combination with one or more of the first through sixteenth aspects, the indication of retransmitted CBs indicates a starting CB and an ending CB for the retransmitted CBs.

In an eighteenth aspect, alone or in combination with one or more of the first through seventeenth aspects, the indication of retransmitted CBs indicates a starting CB and a length for the retransmitted CBs.

In a nineteenth aspect, alone or in combination with one or more of the first through eighteenth aspects, the indication of retransmitted CBs indicates a starting CB for the retransmitted CBs, and the retransmitted CBs include CBs of the TB from the starting CB until a last CB of the transport block.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
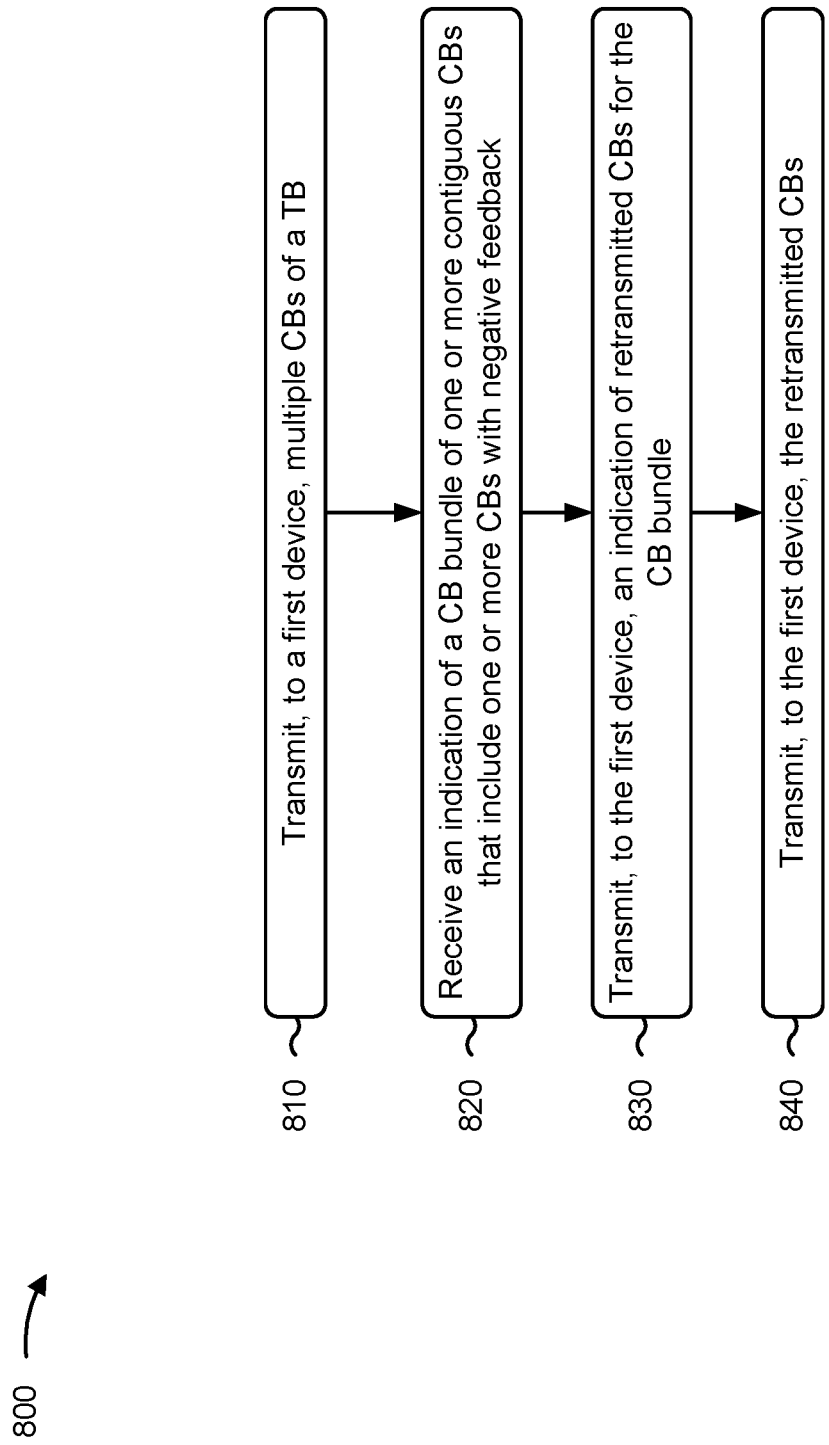
FIG. 8 is a diagram illustrating an example process performed, for example, by a second device, in accordance with the present disclosure.

FIG. 8 is a diagram illustrating an example process 800 performed, for example, by a second device, in accordance with the present disclosure. Example process 800 is an example where the second device (e.g., second device 520) performs operations associated with retransmitting CBs with CB bundle-based feedback.

As shown in FIG. 8, in some aspects, process 800 may include transmitting, to a first device, multiple CBs of a TB (block 810). For example, the second device (e.g., using communication manager 1008 and/or transmission component 1004 depicted in FIG. 10) may transmit, to a first device, multiple CBs of a TB, as described above.

As further shown in FIG. 8, in some aspects, process 800 may include receiving an indication of a CB bundle of one or more contiguous CBs that include one or more CBs with negative feedback (block 820). For example, the second device (e.g., using communication manager 1008 and/or reception component 1002 depicted in FIG. 10) may receive an indication of a CB bundle of one or more contiguous CBs that include one or more CBs with negative feedback, as described above.

As further shown in FIG. 8, in some aspects, process 800 may include transmitting, to the first device, an indication of retransmitted CBs for the CB bundle (block 830). For example, the second device (e.g., using communication manager 1008 and/or transmission component 1004 depicted in FIG. 10) may transmit, to the first device, an indication of retransmitted CBs for the CB bundle, as described above.

As further shown in FIG. 8, in some aspects, process 800 may include transmitting, to the first device, the retransmitted CBs (block 840). For example, the second device (e.g., using communication manager 1008 and/or retransmission component 1010 depicted in FIG. 10) may transmit, to the first device, the retransmitted CBs, as described above.

Process 800 may include additional aspects, such as any single aspect or any combination of aspects described below and/or in connection with one or more other processes described elsewhere herein.

In a first aspect, the indication of retransmitted CBs indicates that all CBs in the CB bundle are retransmitted.

In a second aspect, alone or in combination with the first aspect, the indication of the CB bundle indicates a starting CB and an ending CB for the CB bundle, and the indication of retransmitted CBs indicates a starting CB and an ending CB for the retransmitted CBs.

In a third aspect, alone or in combination with one or more of the first and second aspects, the indication of the CB bundle indicates a starting CB and a length of the CB bundle, and the indication of retransmitted CBs indicates a starting CB and a length of the retransmitted CBs.

In a fourth aspect, alone or in combination with one or more of the first through third aspects, the indication of the CB bundle indicates a starting CB, where the CB bundle includes CBs of the TB from the starting CB until a last CB of the TB, where the indication of retransmitted CBs indicates a starting CB for the retransmitted CBs, and where the retransmitted CBs include CBs of the TB from the starting CB until a last CB of the TB.

In a fifth aspect, alone or in combination with one or more of the first through fourth aspects, the indication of the CB bundle indicates that the indication includes CB bundle-based feedback.

In a sixth aspect, alone or in combination with one or more of the first through fifth aspects, process 800 includes receiving an indication of CBs with negative feedback via CBG-based feedback.

In a seventh aspect, alone or in combination with one or more of the first through sixth aspects, process 800 includes retransmitting all CBs of one or more CBGs based at least in part on the CBG-based feedback.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
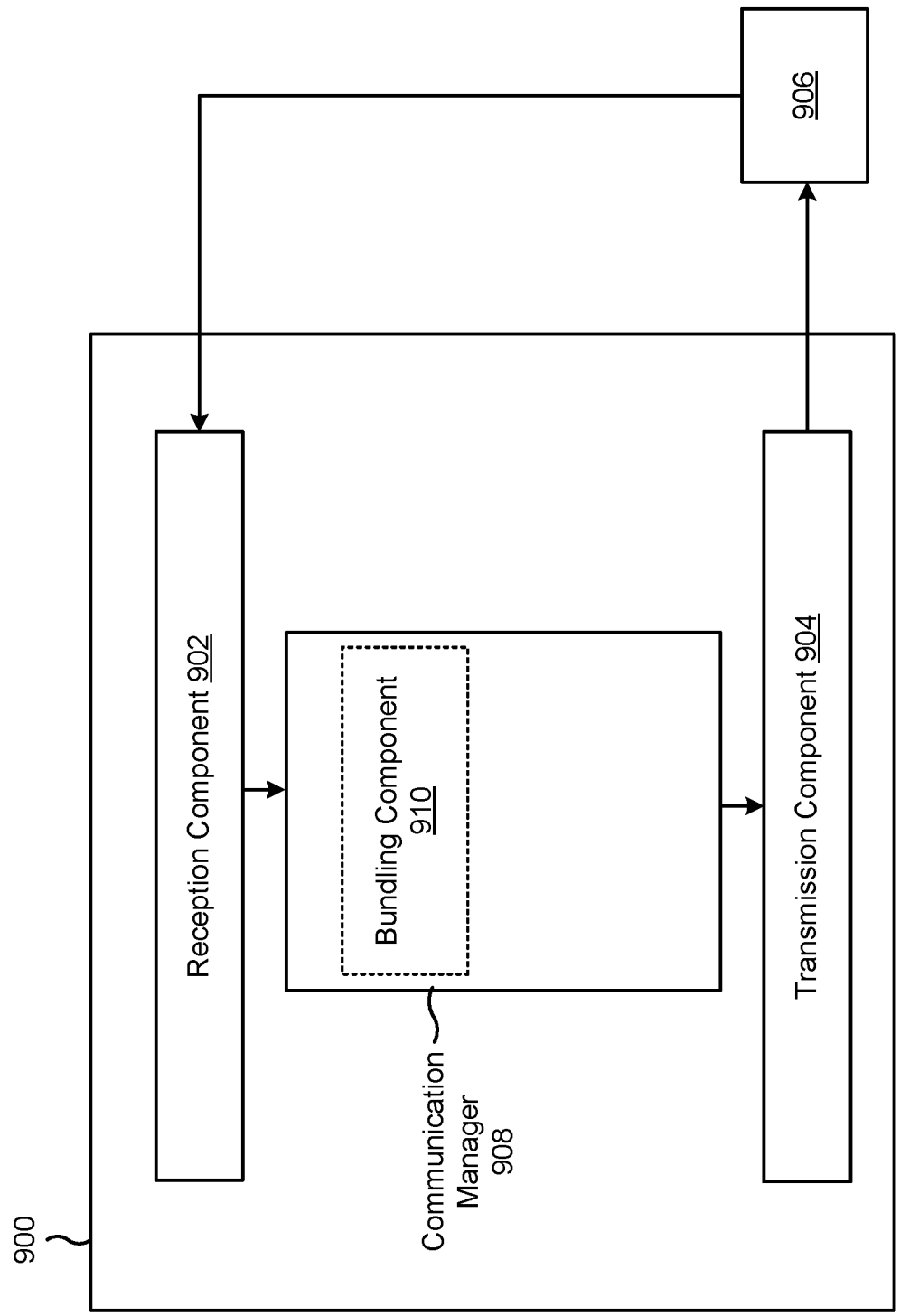
FIGS. 9-10 are diagrams of example apparatuses for wireless communication, in accordance with the present disclosure.

FIG. 9 is a diagram of an example apparatus 900 for wireless communication. The apparatus 900 may be a first device (e.g., a UE 120, a network entity, first device 510), or a first device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network entity, or another wireless communication device) using the reception component 902 and the transmission component 904. As further shown, the apparatus 900 may include communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE 120 or the network entity described in connection with FIG. 2. The communication manager 908 may be, or be similar to, the communication manager 140 or 150 depicted in FIGS. 1 and 2. For example, in some aspects, the communication manager 908 may be configured to perform one or more of the functions described as being performed by the communication manager 140 or 150. In some aspects, the communication manager 908 may include the reception component 902 and/or the transmission component 904. The communication manager 908 may include a bundling component 910, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first device described in connection with FIG. 2. In some aspects, the transmission component 904 may be co-located with the reception component 902 in a transceiver.

The reception component 902 may receive, from a second device, multiple CBs of a TB. The bundling component 910 may identify a CB bundle of one or more contiguous CBs that include one or more CBs for which negative feedback is to be reported. The transmission component 904 may transmit, to the second device, an indication of the CB bundle.

The bundling component 910 may determine a quantity of bits for the indication of the CB bundle in downlink control information based at least in part on a maximum quantity of CBs in the TB.

The bundling component 910 may dynamically switch to a CB bundle-based feedback mode that uses a CB bundle to indicate negative feedback or to a CBG-based feedback mode that uses CBGs to indicate negative feedback.

The reception component 902 may receive an indication of retransmitted CBs for the CB bundle. The reception component 902 may receive the retransmitted CBs.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
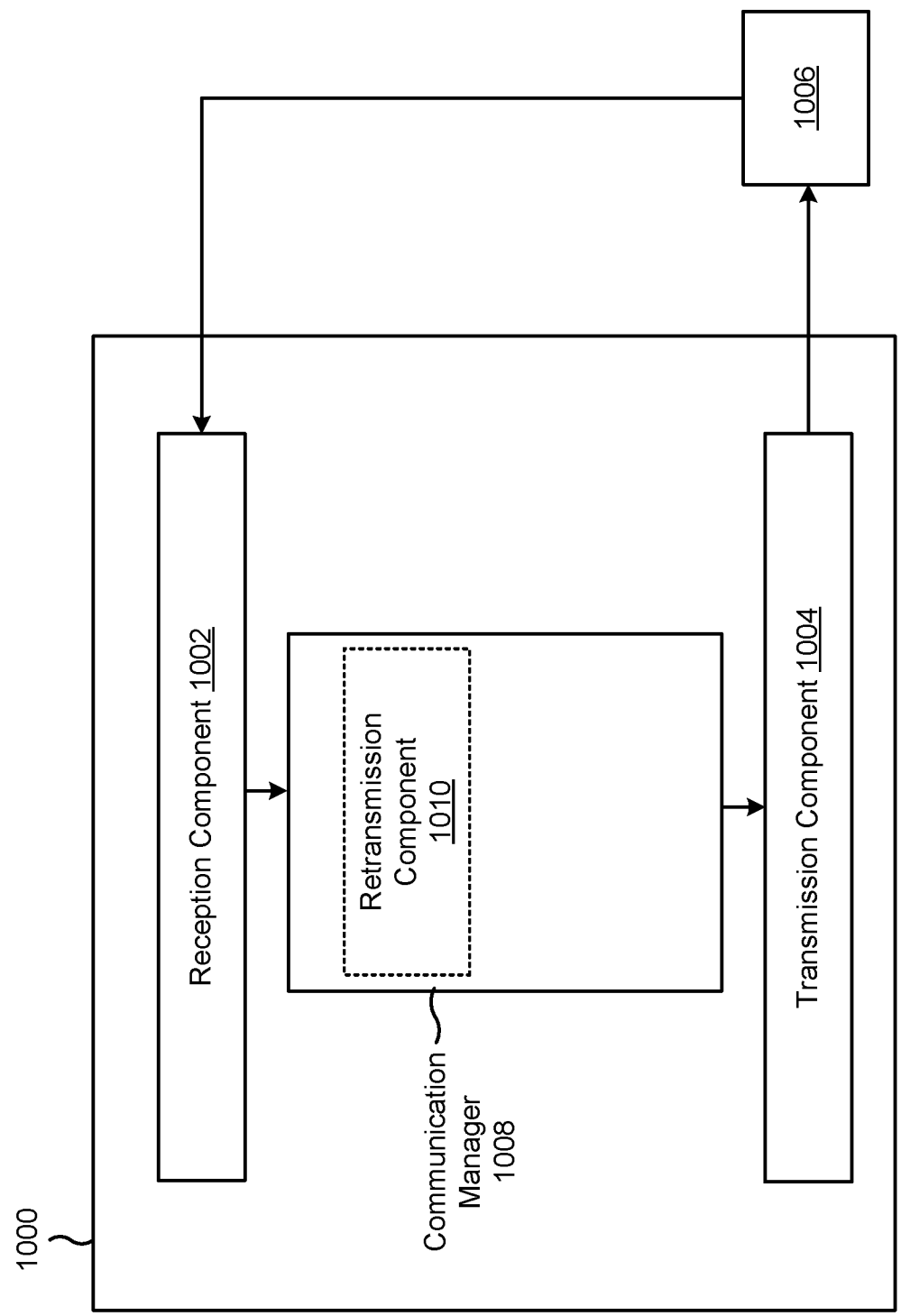

FIG. 10 is a diagram of an example apparatus 1000 for wireless communication. The apparatus 1000 may be a second device (e.g., a UE 120, a network entity, second device 520), or a second device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, or another wireless communication device) using the reception component 1002 and the transmission component 1004. As further shown, the apparatus 1000 may include a communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the UE 120 or the network entity described in connection with FIG. 2. The communication manager 1008 may be, or be similar to, the communication manager 140 or 150 depicted in FIGS. 1 and 2. For example, in some aspects, the communication manager 1008 may be configured to perform one or more of the functions described as being performed by the communication manager 140 or 150. In some aspects, the communication manager 1008 may include the reception component 1002 and/or the transmission component 1004. The communication manager 1008 may include a retransmission component 1010, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the second device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the second device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the second device described in connection with FIG. 2. In some aspects, the transmission component 1004 may be co-located with the reception component 1002 in a transceiver.

The transmission component 1004 may transmit, to a first device, multiple CBs of a TB. The reception component 1002 may receive an indication of a CB bundle of one or more contiguous CBs that include one or more CBs with negative feedback. The retransmission component 1010 may determine to retransmit CBs based at least in part on the indication of the CB bundle. The retransmission component 1010 may generate an indication of retransmitted CBs for the CB bundle. The transmission component 1004 may transmit, to the first device, the indication of retransmitted CBs for the CB bundle. The transmission component 1004 may transmit, to the first device, the retransmitted CBs.

The reception component 1002 may receive an indication of CBs with negative feedback via CBG-based feedback.

The transmission component 1004 may retransmit all CBs of one or more CBGs based at least in part on the CBG-based feedback.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first device, comprising: receiving, from a second device, multiple code blocks (CBs) of a transport block (TB); identifying a CB bundle of one or more contiguous CBs that include one or more CBs for which negative feedback is to be reported; and transmitting, to the second device, an indication of the CB bundle.

Aspect 2: The method of Aspect 1, wherein the indication of the CB bundle corresponds to a hybrid automatic repeat request feedback for the TB.

Aspect 3: The method of Aspect 1 or 2, wherein identifying the CB bundle includes selecting an adjustable length of the CB bundle based at least in part on a quantity and distribution of the one or more CBs for which negative feedback is to be reported.

Aspect 4: The method of any of Aspects 1-3, wherein the indication of the CB bundle indicates a starting CB and an ending CB for the CB bundle.

Aspect 5: The method of Aspect 3, wherein the starting CB is the same as the ending CB, and the CB bundle is one CB.

Aspect 6: The method of any of Aspects 1-5, wherein the indication of the CB bundle indicates a starting CB and a length of the CB bundle.

Aspect 7: The method of Aspect 6, wherein the CB bundle is one CB.

Aspect 8: The method of any of Aspects 1-3, wherein the indication of the CB bundle indicates a starting CB, and wherein the CB bundle includes CBs of the TB from the starting CB until a last CB of the TB.

Aspect 9: The method of any of Aspects 1-8, wherein the CB bundle spans across a boundary between two CB groups (CBGs).

Aspect 10: The method of any of Aspects 1-9, wherein the CB bundle includes one or more CB groups (CBGs).

Aspect 11: The method of any of Aspects 1-10, wherein the indication of the CB bundle includes one bit or a quantity of bits that corresponds to a maximum quantity of CB groups that include the one or more CBs for which negative feedback is to be reported.

Aspect 12: The method of any of Aspects 1-11, further comprising determining a quantity of bits for the indication of the CB bundle in downlink control information based at least in part on a maximum quantity of CBs in the TB.

Aspect 13: The method of any of Aspects 1-12, further comprising dynamically switching to a CB bundle-based feedback mode that uses a CB bundle to indicate negative feedback or to a CB group (CBG)-based feedback mode that uses CBGs to indicate negative feedback.

Aspect 14: The method of Aspect 13, wherein the indication of the CB bundle indicates that the indication includes CB bundle-based feedback.

Aspect 15: The method of Aspect 13 or 14, wherein the dynamically switching includes dynamically switching to the CB bundle-based feedback mode or to the CBG-based feedback mode based at least in part on a distribution pattern of the one or more CBs for which negative feedback is to be reported.

Aspect 16: The method of any of Aspects 13-15, wherein the dynamically switching includes dynamically switching to the CB bundle-based feedback mode or to the CBG-based feedback mode based at least in part on which mode yields a smaller quantity of the one or more CBs that are to be retransmitted.

Aspect 17: The method of any of Aspects 13-16, further comprising: receiving an indication of retransmitted CBs for the CB bundle; and receiving the retransmitted CBs.

Aspect 18: The method of Aspect 17, wherein the indication of retransmitted CBs indicates a starting CB and an ending CB for the retransmitted CBs.

Aspect 19: The method of Aspect 17 or 18, wherein the indication of retransmitted CBs indicates a starting CB and a length for the retransmitted CBs.

Aspect 20: The method of Aspect 17, wherein the indication of retransmitted CBs indicates a starting CB for the retransmitted CBs, and wherein the retransmitted CBs include CBs of the TB from the starting CB until a last CB of the transport block.

Aspect 21: A method of wireless communication performed by a second device, comprising: transmitting, to a first device, multiple code blocks (CBs) of a transport block (TB); receiving an indication of a CB bundle of one or more contiguous CBs that include one or more CBs with negative feedback; transmitting, to the first device, an indication of retransmitted CBs for the CB bundle; and transmitting, to the first device, the retransmitted CBs.

Aspect 22: The method of Aspect 21, wherein the indication of retransmitted CBs indicates that all CBs in the CB bundle are retransmitted.

Aspect 23: The method of Aspect 21 or 22, wherein the indication of the CB bundle indicates a starting CB and an ending CB for the CB bundle, and wherein the indication of retransmitted CBs indicates a starting CB and an ending CB for the retransmitted CBs.

Aspect 24: The method of any of Aspects 21-23, wherein the indication of the CB bundle indicates a starting CB and a length of the CB bundle, and wherein the indication of retransmitted CBs indicates a starting CB and a length of the retransmitted CBs.

Aspect 25: The method of any of Aspects 21-23, wherein the indication of the CB bundle indicates a starting CB, wherein the CB bundle includes CBs of the TB from the starting CB until a last CB of the TB, wherein the indication of retransmitted CBs indicates a starting CB for the retransmitted CBs, and wherein the retransmitted CBs include CBs of the TB from the starting CB until a last CB of the TB.

Aspect 26: The method of any of Aspects 21-25, wherein the indication of the CB bundle indicates that the indication includes CB bundle-based feedback.

Aspect 27: The method of any of Aspects 21-26, further comprising receiving an indication of CBs with negative feedback via CB group (CBG)-based feedback.

Aspect 28: The method of Aspect 27, further comprising retransmitting all CBs of one or more CBGs based at least in part on the CBG-based feedback.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
one or more memories; and
one or more processors, coupled to the one or more memories, configured to:
receive multiple code blocks (CBs) of a transport block (TB);
identify a CB bundle based at least in part on a quantity and distribution of one or more CBs for which negative feedback is to be reported; and
transmit an indication of the CB bundle.

2. The first device of claim 1, wherein the indication of the CB bundle corresponds to a hybrid automatic repeat request feedback for the TB.

3. The first device of claim 1, wherein the one or more processors, to identify the CB bundle, are configured to select an adjustable length of the CB bundle based at least in part on the quantity and the distribution of the one or more CBs for which negative feedback is to be reported.

4. The first device of claim 1, wherein the indication of the CB bundle indicates a starting CB and an ending CB for the CB bundle.

5. The first device of claim 4, wherein the starting CB is the same as the ending CB, and the CB bundle is one CB.

6. The first device of claim 1, wherein the indication of the CB bundle indicates a starting CB and a length of the CB bundle.

7. The first device of claim 6, wherein the CB bundle is one CB.

8. The first device of claim 1, wherein the indication of the CB bundle indicates a starting CB, and wherein the CB bundle includes CBs of the TB from the starting CB until a last CB of the TB.

9. The first device of claim 1, wherein the CB bundle spans across a boundary between two CB groups (CBGs).

10. The first device of claim 1, wherein the CB bundle includes one or more CB groups (CBGs).

11. The first device of claim 1, wherein the indication of the CB bundle includes one bit or a quantity of bits that corresponds to a maximum quantity of CB groups that include one or more CBs for which negative feedback is to be reported.

12. The first device of claim 1, wherein the one or more processors are configured to determine a quantity of bits for the indication of the CB bundle based at least in part on a maximum quantity of CBs in the TB.

13. The first device of claim 1, wherein the one or more processors are configured to dynamically switch to a CB bundle-based feedback mode that uses a CB bundle to indicate negative feedback or to a CB group (CBG)-based feedback mode that uses CBGs to indicate negative feedback.

14. The first device of claim 13, wherein the indication of the CB bundle indicates that the indication includes CB bundle-based feedback.

15. The first device of claim 13, wherein the one or more processors, to dynamically switch, are configured to dynamically switch to the CB bundle-based feedback mode or to the CBG-based feedback mode based at least in part on a distribution pattern of one or more CBs for which negative feedback is to be reported.

16. The first device of claim 13, wherein the one or more processors, to dynamically switch, are configured to dynamically switch to the CB bundle-based feedback mode or to the CBG-based feedback mode based at least in part on which mode yields a smaller quantity of one or more CBs that are to be retransmitted.

17. The first device of claim 1, wherein the one or more processors are configured to:
receive an indication of retransmitted CBs for the CB bundle; and
receive the retransmitted CBs.

18. The first device of claim 17, wherein the indication of retransmitted CBs indicates a starting CB and an ending CB for the retransmitted CBs.

19. The first device of claim 17, wherein the indication of retransmitted CBs indicates a starting CB and a length for the retransmitted CBs.

20. The first device of claim 17, wherein the indication of retransmitted CBs indicates a starting CB for the retransmitted CBs, and wherein the retransmitted CBs include CBs of the TB from the starting CB until a last CB of the transport block.

21. A second device for wireless communication, comprising:
one or more memories; and
one or more processors, coupled to the one or more memories, configured to:
transmit, to a first device, multiple code blocks (CBs) of a transport block (TB);
receive an indication of a CB bundle, wherein the indication of the CB bundle indicates a starting CB and an ending CB for the CB bundle, with negative feedback;
transmit an indication of retransmitted CBs for the CB bundle; and
transmit, to the first device, the retransmitted CBs.

22. The second device of claim 21, wherein the indication of retransmitted CBs indicates that all CBs in the CB bundle are retransmitted.

23. The second device of claim 21, and wherein the indication of retransmitted CBs indicates a starting CB and an ending CB for the retransmitted CBs.

24. The second device of claim 21, wherein the indication of the CB bundle indicates a starting CB and a length of the CB bundle, and wherein the indication of retransmitted CBs indicates a starting CB and a length of the retransmitted CBs.

25. The second device of claim 21, wherein the indication of the CB bundle indicates a starting CB, wherein the CB bundle includes CBs of the TB from the starting CB until a last CB of the TB, wherein the indication of retransmitted CBs indicates a starting CB for the retransmitted CBs, and wherein the retransmitted CBs include CBs of the TB from the starting CB until a last CB of the TB.

26. The second device of claim 21, wherein the indication of the CB bundle indicates that the indication includes CB bundle-based feedback.

27. The second device of claim 21, wherein the one or more processors are configured to receive an indication of CBs with negative feedback via CB group (CBG)-based feedback.

28. The second device of claim 27, wherein the one or more processors are configured to retransmit all CBs of one or more CBGs based at least in part on the CBG-based feedback.

29. A method of wireless communication performed by a first device, comprising:
   receiving multiple code blocks (CBs) of a transport block (TB);
   identifying a CB bundle based at least in part on a quantity and distribution of one or more CBs for which negative feedback is to be reported; and
   transmitting an indication of the CB bundle.

30. A method of wireless communication performed by a second device, comprising:
   transmitting, to a first device, multiple code blocks (CBs) of a transport block (TB);
   receiving an indication of a CB bundle, wherein the indication of the CB bundle indicates a starting CB and an ending CB for the CB bundle, with negative feedback;
   transmitting an indication of retransmitted CBs for the CB bundle; and
   transmitting, to the first device, the retransmitted CBs.

\* \* \* \* \*